(No Model.) 2 Sheets—Sheet 1.

R. A. ROSE.
SPRING TOOTH HARROW.

No. 381,171. Patented Apr. 17, 1888.

Witnesses,
J. C. Barnard.
Fred. P. Babcock.

Inventor,
Reuben A. Rose,
By his Attorney
Geo. B. Selden.

(No Model.) 2 Sheets—Sheet 2.
R. A. ROSE.
SPRING TOOTH HARROW.

No. 381,171. Patented Apr. 17, 1888.

Witnesses.
J. C. Barnard.
Fred P. Babcock.

Inventor.
Reuben A. Rose,
By his Attorney
Geo. B. Selden

UNITED STATES PATENT OFFICE.

REUBEN A. ROSE, OF GENESEO, NEW YORK.

SPRING-TOOTH HARROW.

SPECIFICATION forming part of Letters Patent No. 381,171, dated April 17, 1888.

Application filed November 14, 1887. Serial No. 255,020. (No model.)

*To all whom it may concern:*

Be it known that I, REUBEN A. ROSE, of Geneseo, New York, have invented certain Improvements in Spring-Tooth Harrows, of which the following is a specification, reference being had to the accompanying drawings.

My improvements in spring-tooth harrows relate more particularly to an improved pivoted adjustable guard or fender attached to the bars of the harrow, and arranged so that the depth at which the teeth act on the earth may be varied, and which guard also serves to smooth the surface and to prevent the harrow from becoming stuck or loaded in soft ground.

My invention is fully described and illustrated in the following specification and accompanying drawings, and the novel feature thereof specified in the claims annexed to the said specification.

Figure 1:
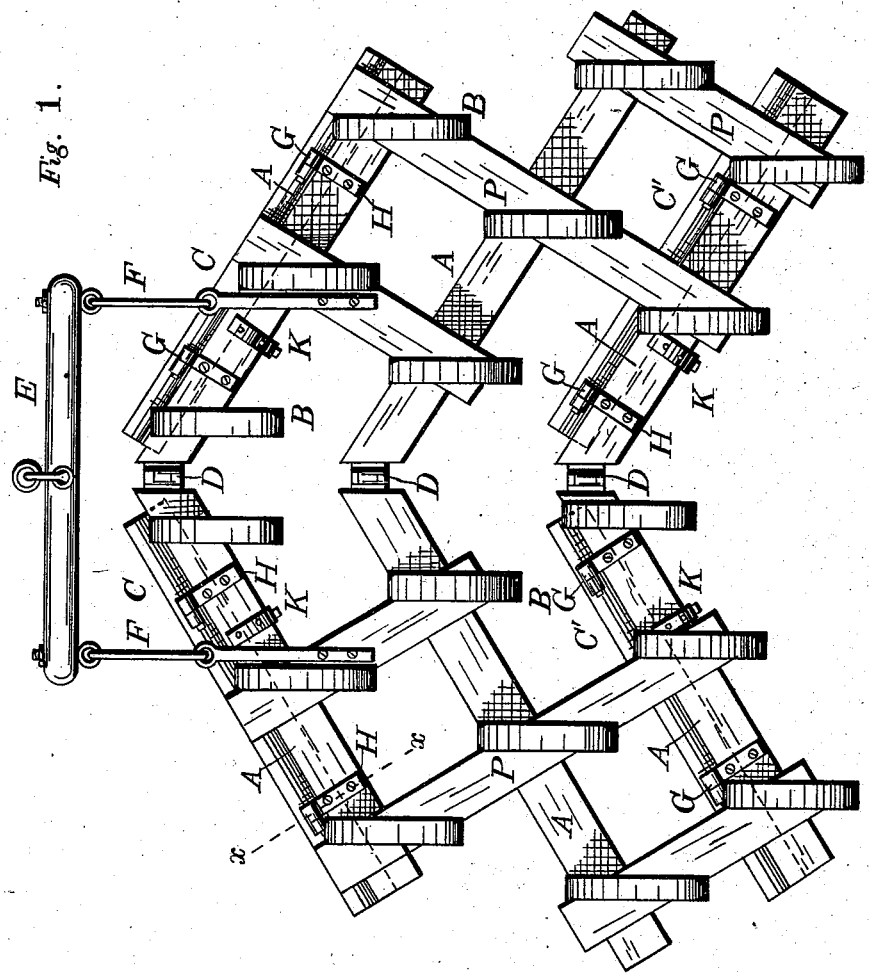
Figure 2:
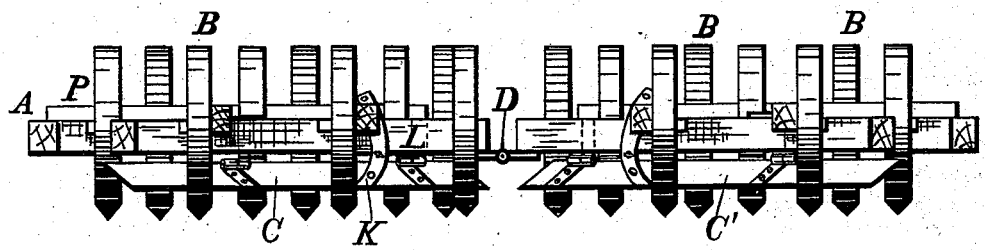
Figure 3:
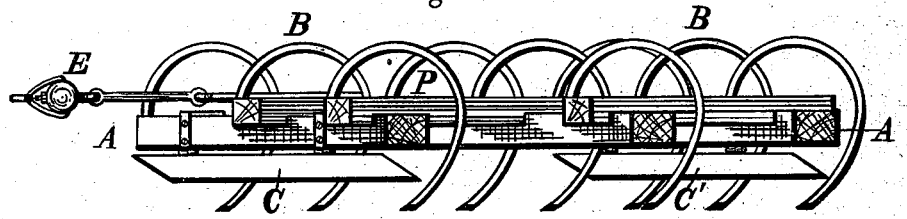
Figure 4:
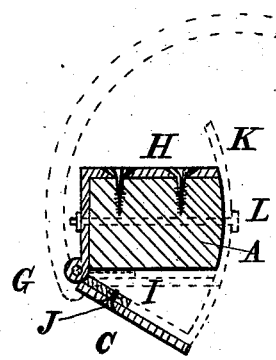
Figure 5:
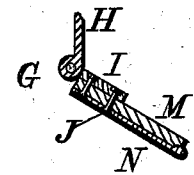

In the accompanying drawings, representing my improvements in spring-tooth harrows, Figure 1 is a plan view. Fig. 2 is a rear elevation. Fig. 3 is a side view. Fig. 4 is a section on the line $x$ $x$, Fig. 1. Fig. 5 is a section representing a modified construction of the guards.

The frame of my improved spring-tooth harrow is represented at A A in the accompanying drawings. B B are the teeth, and C C' the adjustable guards or fenders. The frame is of the ordinary construction, consisting of the bars A A, hinged together at D, so that the harrow is divided into two sections which can adjust themselves to the irregularities of the ground over which it passes. Provision is made for the draft of the harrow in any suitable manner—as, for instance, by the draw-bar E, fastened to the sections by the links F F. The evener is attached to the center of the draw-bar.

The teeth B are of any ordinary or preferred construction, being attached, preferably, to the under side of the bars A A and curving upward and backward, so that their points enter the ground below and in rear of the bars. As represented in Fig. 1, the teeth are arranged out of line with each other, so that the rear teeth do not follow the furrows made by the forward teeth. The bars are inclined backward from the line of draft, as shown in Fig. 1.

The guards C C' are arranged below the front and rear bars of the harrow-frame, and parallel, or nearly so, with the length of the bars. The guards consist of plates of metal, or of wood faced with metal, attached to the bars by hinges or other suitable devices which permit the adjustment of the rear edges of the guards to and from the bars. The guards are inclined downward and backward, so that they will readily pass over any roughness or obstruction. The hinges G G shown in the accompanying drawings consist of the straps H, fastened to the bars and provided at their forward ends with eyes or pintles which fit corresponding parts on the straps I, which are secured to the guards C.

The straps H may be straight and fastened to the front or lower sides of the bars; but I prefer, for durability and facility of attachment or removal, to bend them over the tops of the bars, as represented more fully in Fig. 4. The hinge is located slightly in front of and below the lower front corner of the bar, so that the guard may be folded up nearly or quite parallel with the under surface of the bar, if desired, as indicated by the dotted lines in Fig. 4. The guards are thus thrown out of operation entirely, and the harrow works in exactly the same manner as one of ordinary construction. The straps I are secured to the guards by bolts J, Fig. 4, having countersunk heads.

Provision is made for adjusting the inclination of the guards relative to the horizontal line, so as to vary the depth of the furrows made by the teeth, by means of the arms K, attached to the rear edge of the guards and extending upward and adjustably connected to the bars in any suitable manner. In Fig. 4 I have shown this connection as consisting of a bolt, L, passing through the bar and any one of a series of holes in the arm; but it is obvious that any other suitable device may be used for this purpose—such, for instance, as a screw and clamp.

The guards are made of the full length of the bars, or nearly so, and present a continuous surface extending lengthwise of the bars, which bears on the ground and smooths it as the harrow advances, and which also serves to limit the depth to which the teeth enter the ground. As will be observed from the drawings, the guards bear on the ground immediately in front of the teeth attached to the bars provided with the guards. The guards are attached to the front and rear bars of each of the harrow-sections.

In a modified form of the construction shown in Fig. 5 the guard is represented as consisting of a wooden board, M, having a sheet-metal facing, N, attached to its lower side. Increased durability is secured by thickening the rear or bearing edge of the metallic facing N, as indicated in the said figure. The bars A of the frame are connected together by suitable cross-bars, P. The holes in the arms K should correspond in distance from the guards, so that all the guards can be set at the same angle with the frame, to secure uniform action of all the teeth.

When the guards are folded up, the harrow acts in all respects like one of the ordinary construction.

I am aware that spring-toothed harrows and cultivators have heretofore been constructed with adjustable guards to vary the depth of the furrows made by the teeth, and I do not wish to be understood as attempting to claim such construction broadly.

I claim—

1. The combination, with the harrow-frame having spring-teeth mounted on its front and rear bars, of guards hinged at their forward edges to said front and rear bars in advance of the spring-teeth, the rear edges of said guards being connected by a rigid adjustable connection to their respective supporting-bars, whereby the depth of the furrow made by such teeth may be regulated, substantially as described.

2. The combination, with the harrow-frame having spring-teeth mounted on its front and rear bars, of guards hinged at their forward edges to said front and rear bars and extending throughout their entire length in advance of the spring-teeth, the rear edges of said guards having the upwardly-extending arms $k$ adjustably connected to their respective supporting-timbers, substantially as described.

3. The combination, with the harrow formed of two sections, the front and rear timbers of each of which are inclined back from the line of draft, said timbers having spring-teeth secured thereto, of guards hinged at their forward edges to the under side of each of said timbers in advance of the spring-teeth, the rear edges of said guards being provided with the rigid arms $k$ and adjustable connections between said arms and their respective supporting-timbers, substantially as described.

4. The combination, with a spring-tooth harrow, of an inclined guard, C, hinged to the harrow-timbers at its forward edge and adjustably connected thereto at its rear edge, and consisting of the wooden plate M, having metal facing N, provided with a thickened wearing-surface at the rear edge, substantially as described.

5. The combination, with the bar A of a spring-tooth harrow, of the inclined pivoted adjustable guard C, extending continuously from end to end of the bar and attached thereto by the hinges G, consisting of the strap secured to the upper side of the guard and the strap H bent over the upper side of the bar and secured thereto, substantially as described.

REUBEN A. ROSE.

Witnesses:
GEO. B. SELDEN,
JOHN F. SKINNER.